United States Patent [19]
Whitfield, Jr.

[11] 3,840,358
[45] Oct. 8, 1974

[54] APPARATUS FOR PRODUCING GLASS FIBERS HAVING INSULATING MATERIAL WITH A REFRACTORY FABRIC

[75] Inventor: James Whitfield, Jr., Anderson, S.C.

[73] Assignee: Owens-Corning Fiberglas Corporation, Toledo, Ohio

[22] Filed: Aug. 7, 1972

[21] Appl. No.: 278,305

[52] U.S. Cl. .................................... 65/1, 65/374
[51] Int. Cl. ................................... C03b 37/02
[58] Field of Search ............ 65/11 W, 11 R, 1, 374; 210/1 A; 432/248

[56] References Cited
UNITED STATES PATENTS

| | | | |
|---|---|---|---|
| 2,296,392 | 9/1942 | Marchant | 110/1 A |
| 2,321,813 | 6/1943 | Henzel | 110/1 A |
| 2,447,482 | 8/1948 | Arnold | 110/1 A |
| 2,550,252 | 4/1951 | Jendrisak | 65/374 |
| 3,272,609 | 9/1966 | Benton | 65/11 W |
| 3,334,981 | 8/1967 | Glaser | 65/11 W |
| 3,685,978 | 8/1972 | Hansen et al. | 65/1 |

Primary Examiner—Robert L. Lindsay, Jr.
Attorney, Agent, or Firm—Carl G. Staelin; John W. Overman

[57] ABSTRACT

A feeder for flowing streams of molten glass to be drawn out into fibers wherein a metal melting chamber is encased in an enclosure made from castable refractory and a high strength, high temperature resistant fabric is embedded in the surface regions of the refractory to retain and support the refractory.

6 Claims, 3 Drawing Figures

APPARATUS FOR PRODUCING GLASS FIBERS HAVING INSULATING MATERIAL WITH A REFRACTORY FABRIC

BACKGROUND OF THE INVENTION

This invention relates to the production of fibers from heat-softenable materials such as glass and particularly to an apparatus for supporting the refractory insulation which is typically placed around a feeder or bushing used for supplying streams of glass.

In the production of continuous glass fibers, a stream feeder or bushing is used for supplying a plurality of molten glass streams which are attenuated or drawn out to form fibers. Usually, the feeder is an open metal box of generally elongated, rectangular shape. A plurality of small orifices are provided in the bottom wall of the feeder and the molten glass flows through these orifices forming the heat-softened glass streams. The feeder is heated to glass melting temperatures by its own electrical resistance.

To withstand the high temperatures encountered in melting glass, a platinum and rhodium alloy is generally used to form the feeder. Although stronger than plain platinum, such alloys are nonetheless ductile and accordingly subject to deformation especially at the high temperature and under the dynamic load of molten glass.

To help retain heat and give added support to the feeder, refractory insulation is provided about the end and side walls of the feeder. A metal support frame holds the insulation and feeder in position beneath and in line with an opening from which the necessary glass materials are supplied. Because the feeder carries electric current, it is important that the frame be prevented from contacting the feeder. Therefore, there is an area of refractory about the orificed bottom wall which is exposed and unsupported by the frame. During its operation a feeder expands and contracts because of heating and cooling. This combined heat and pressure exerts forces on the refractory causing it to crack and break away. The pieces which break away may pull along small amounts of valuable platinum which may then be lost. Also, once the refractory is cracked or broken, it offers less support for the feeder. Thus, the feeder will more quickly succumb to the dynamic pressures and heat exerted by the molten glass. The feeder will tend to sag or deform until it can no longer form satisfactory fibers.

SUMMARY OF THE INVENTION

Accordingly, it is an object of the invention to extend the useful production life of a stream feeder by providing more complete support for the refractory insulation placed about the feeder.

Another object of the invention is to provide a refractory support means which is simply and quickly installed and which is compatible with present feeder construction methods.

Yet another object of the invention is to save platinum that is otherwise lost in using conventional feeder units.

In brief, the present invention accomplishes the above objectives by providing a woven fabric support over the exposed surface of the insulating refractory which encompasses the stream feeder used for glass fiber production. The support fabric covers or is embedded in the entire exposed under surface of the refractory and is attached at one side to the feeder and at the other side to the feeder frame. The fabric functions to reduce or prevent refractory from cracking and falling away from the feeder thus also reducing the loss of platinum and the shortening of feeder life.

BRIEF DESCRIPTION OF THE DRAWINGS

Other objects, features and advantages will become readily apparent when the following description is taken in conjunction with the accompanying drawings, in which.

DESCRIPTION OF THE PREFERRED EMBODIMENT

Figure 1:
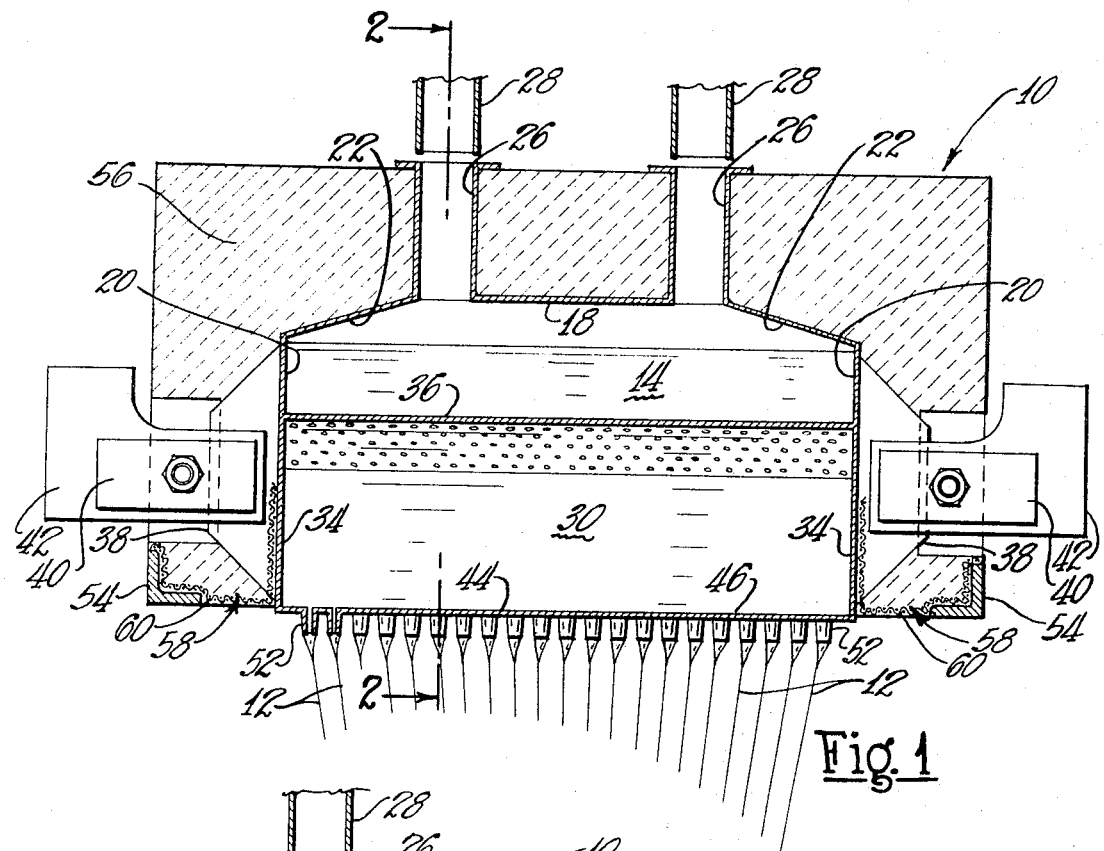
FIG. 1 is a vertical sectional view of the glass heating and conditioning apparatus of the invention.

Referring to the drawings in detail, a form of the apparatus of the invention is illustrated which is adaptable for the formulation of fine continuous filaments of glass for forming textile filaments. It includes a melter and feeder construction or unit, generally indicated by reference numeral 10, for heat-conditioning glass. The heated glass is flowed through orificed projections provided in the floor of the feeder tip section 44 as fine streams, which are attenuated into fine continuous filaments 12. The arrangement further comprises a substantially rectangular melter region 14, defined by sidewalls 16, a top cover plate 18, and end walls 20, the side and end walls being joined with the horizontal cover plate 18 by angularly arranged connecting portions 22 and 24. The cover plate is provided with coupling tubes 26, which are in registration with chute means 28, which guide preformed glass marbles from a suitable hopper means into the feeder construction.

Figure 2:
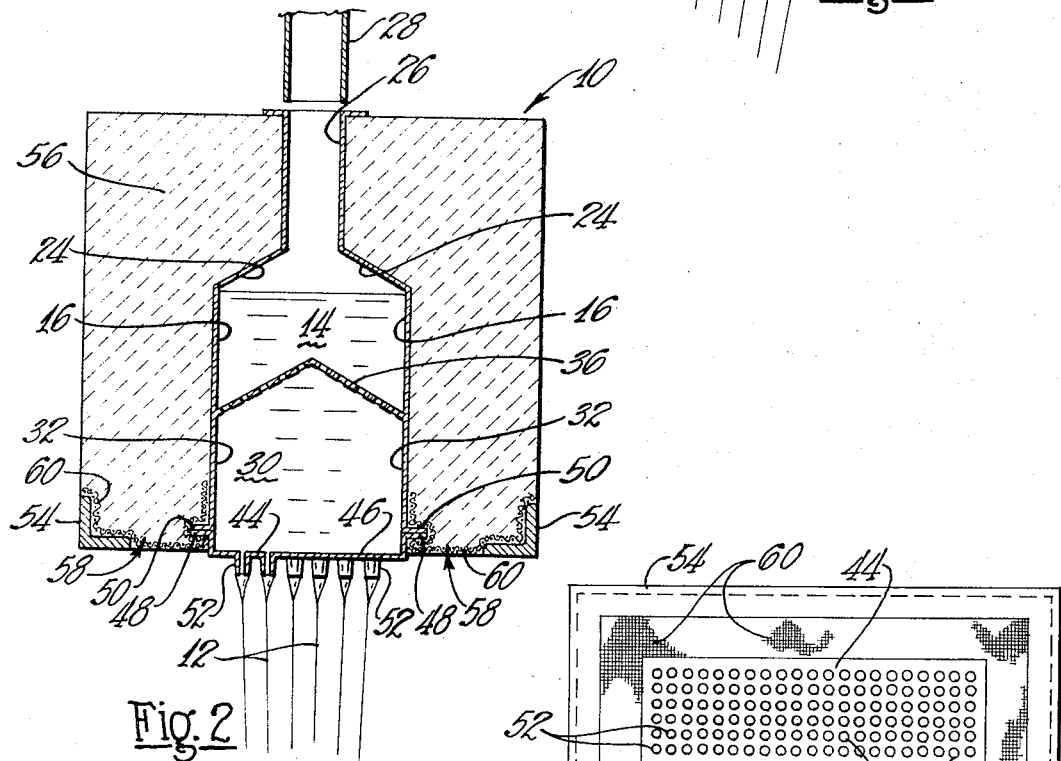
FIG. 2 is a sectional view of the apparatus illustrated in FIG. 1, taken along line 2—2 thereof.

The feeder section, or region 30, is provided with side walls 32, which are joined with the side walls of the melter section to form extensions thereof. The end walls 34 of the feeder section are also formed as extensions of the end walls 20 of the melter section. A current conducting or heater screen 36, preferably formed of an alloy of platinum and rhodium, in the shape of an inverted V, is disposed lengthwise between the melter region 14 and the feeder, or conditioning region 30, as particularly illustrated in FIG. 2, and is formed of a suitable mesh to prevent the entrance of any unmelted fragments or pieces of glass entering the feeder section.

Welded to each end of the melter feeder unit 10 are terminals 38, which are connected by clamps 40 with suitable bus bars or current conductors 42, which are coupled by suitable conductors to a source of electrical energy, not shown. This provides the media for melting the glass in the melter section and heat-conditioning in the feeder, or conditioning section 30, to the desired viscosity to obtain a required through-put through the orifices in a tip section of the feeder.

The receptacle providing the melter region and the feeder region may be formed of metals or alloys capable of withstanding the intense heat of the molten glass or other mineral material. Alloys of platinum and rhodium have been found to be generally satisfactory for the purpose.

The floor of the feeder region 30 is usually referred to as the tip section. It is formed with depending hollow projections, or tips 52, providing passages or orifices through which flows streams of molten glass from the feeder. In the embodiment illustrated, the feeder, or tip section 44, is of generally rectangular shape, having a horizontally planar floor portion 46, with which are joined flanges 48, which are welded to outwardly extending flanges 50, formed on the sidewalls 32 of the feeder section 30.

In practice, there is typically disposed, lengthwise of the tip section 44, a manifold having an inlet and outlet for connection with a heat-absorbing or heat-transfer medium, such as water, circulated through the manifold. Connected to the manifold are longitudinal environmental control means or fins which project out between the rows of tips 52 and absorb heat therefrom.

The supporting member for the melter and feeder unit 10 is a frame 54, generally rectangular in shape, and of greater size than the melter or feeder sections. The frame 54 is typically provided with lug means for attachment to a primary frame, not shown, which also is effective to support the associated supply hopper for the preformed glass marbles, and suitable marble metering means which supply glass marbles to the chutes 28. The frame 54 is open at the bottom to permit the bottom of the feeder section, and more particularly, the projections of the tip section 44, to be exposed through the opening. Also, the opening is sufficiently large to assure that the metal frame 54 does not contact the current carrying melter-feeder 10.

Between the frame 54 and the melter and feeder unit 10, there is a poured castable refractory insulating material 56. The insulating material fits closely against both the outer surfaces of the metallic side and end walls of the melter and feeder unit 10 and against the inner surface of the frame 54.

Figure 3:
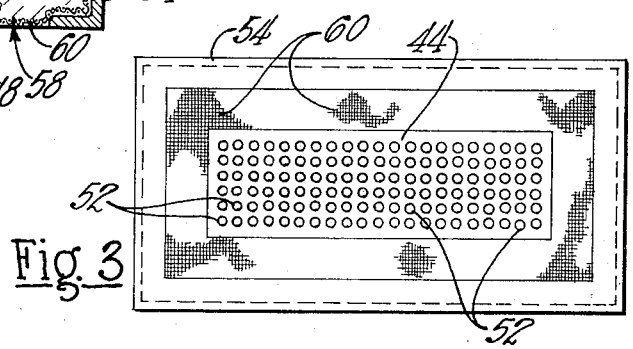
FIG. 3 is an elevational view of the bottom surface of the apparatus illustrated in FIG. 1.

Interposed between the refractory and the walls of the feeder is a high strength, high temperature resistant fabric 60. As shown in FIG. 3, the fabric covers the otherwise exposed bottom surface 58 of the refractory 56 between the metal walls 32 and 34 and the frame 54, and it functions as a support for the refractory. As is more clearly seen in FIG. 2, the support fabric extends over the refractory surface 58 from a point overlapping the flanges 48 and 50 to a point overlapping the frame 54. The compressive and frictional forces between the refractory 56 and the frame 54 and feeder 30 provide the necessary anchoring points for the fabric.

The fabric used to support the refractory should be made of a material that will operate continuously at high temperature above 2000° F. without substantial deterioration. Also the fabric must have sufficient strength to help the refractory. Examples of fabrics which have these characteristics include ones made of fibers of glass, asbestos, quartz, refractory or silica.

The melter-feeder unit 10 may be fabricated in a relatively conventional manner. The metal frame and the uninsulated metal shell which defines the metal-feeder are placed in an upright position on a work table. A jig (not shown) is used to hold the frame and metal shell in their relative positions. The support fabric is then positioned in place between the feeder and the frame. Typically, the fabric is cut into four pieces and each piece is soaked with water to make it easier to handle and form to the shape of the feeder and frame. As the wet fabric is molded against the walls of the feeder, provisions must be made for accomodating thermocouple wires and the like (not shown). Usually this means opening portions of the weave of the fabric sufficiently to allow the wires to be pulled through. Once all the fabric is laid up against the frame and feeder, it may be helpful to pour a small amount of castable refractory on the fabric between the frame and the feeder-melter. By pressing against the moldable refractory and cloth with a sharp wedge-shaped tool such as a putty knife, a tighter fit between the refractory, fabric, feeder and frame can be obtained. Also by applying such pressure the refractory is forced into the weave of the fabric so a stronger bond between fabric and refractory is achieved.

Once the fabric is sufficiently pressed into place, a suitable form for retaining the castable refractory is placed around the feeder and frame. The remaining castable refractory is then poured into the form so that it completely encases the feeder, support fabric and frame. This poured in place refractory serves at least two functions in reducing the loss of heat from the feeder and supplying structural strength and rigidity thereto. The feeder with the green insulation and fabric thereabout is placed in a suitable oven for several hours to cure and dry the refractory. After drying, the form surrounding the cast refractory is removed and the insulated feeder is ready to be installed. After it has been positioned in its operating location, the electrical power leads are connected to the feeder terminals. A small amount of glass is placed inside the melter-feeder to protect it against overheating and the power is turned on. During startup and throughout its operational life, the melter-feeder is subjected to many thermal stresses as well as substantial physical pressures exerted by the glass. These stresses and pressures tend to cause the refractory to crack and separate from the melter-feeder. By providing the support fabric for the refractory, the damage done to the refractory and feeder is minimized.

The preferred embodiment has been described herein with reference to conventional marble-melt feeders. However, the support fabric of this invention is also applicable to feeders used in the glass fiber process known as direct melt wherein glass is first melted in a furnace and delivered to the feeders by way of forehearth channels. Also the invention is not limited to supporting only the bottom refractory. If necessary the fabric could be used to support the entire refractory body. However, experience to date has shown that the most benefit is obtained by supporting the exposed bottom refractory surface which surrounds the feeder.

It is apparent that within the scope of this invention modifications and different arrangements may be made other than disclosed and that the present disclosure is illustrative merely, the invention comprehending all variations thereof.

I claim:

1. Apparatus for supply of heat-softened mineral material comprising:
 a feeder having side walls and a bottom wall with orifices formed therein through which streams of heat-softened mineral material may flow;
 support means for the feeder, such support means being in spaced apart relationship with the side walls at the bottom of the side walls;

a refractory insulating material filling the space at the bottom of the side walls between the feeder and the support means, the refractory material encompassing the side walls of the feeder and providing supporting connection between such feeder and support means; and a fabric of heat resistant material covering at least a portion of the bottom surface of the refractory insulating material between the feeder and the support means, the fabric being suitably attached at opposite sides of the covered bottom surface of the refractory material and being in reinforcing relation with the refractory material.

2. Apparatus for supply of heat-softened mineral material, as recited in claim 1, wherein the fabric is composed of heat resistant fiber selected from the group consisting of glass, quartz, silica, refractory or asbestos.

3. Apparatus, as recited in claim 1, wherein the heat resistant fabric comprises woven filaments.

4. Apparatus for supply of a plurality of streams of heat-softened glass for attenuation into glass fibers, comprising:

a feeder having side walls and a bottom wall with orifices formed herein for the delivery of streams of glass;

support means in spaced relation about the bottom of the side walls of the feeder;

a cast refractory insulation filling the space between the feeder and the support means to provide a supporting connection between the feeder and support means, the cast refractory surrounding the side walls of the feeder; and a fabric of heat resistant material convering at least a portion of the bottom surface of the cast refractory insulation between the feeder and the support means, the fabric being suitably attached to the feeder and the support means and being in reinforcing relation with the refractory material.

5. Apparatus for supply of a plurality of streams of heat-softened glass for attenuation into glass fibers, comprising:

a feeder having side walls and a bottom wall with orifices formed in the bottom wall for delivery of streams of heat-softened glass;

support means in spaced apart relationship with the bottom of the side walls of the feeder;

a heat resistant fabric overlapping a portion of the outside surface of the side walls to the bottom of the side walls and extending from the bottom of the side walls to the support means and overlapping a portion of the inside surface of the support means; and a cast refractory insulation disposed between the feeder and the support means so that the cast refractory encompasses the side walls of the feeder and is in direct contact with the fabric whereby the fabric is in reinforcing relation with the bottom of the cast refractory and is held in place by the compressive and frictional forces exerted by the cast refractory on the portions of the fabric which overlap the outside surface of the side walls and the inside surface of the support means.

6. Apparatus for supply of heat-softened mineral material comprising:

a feeder having side walls and a bottom wall with orifices formed therein through which streams of heat-softened mineral material can flow;

support means for the feeder, such support means being in spaced apart relationship with the side walls of the feeder at the bottom of the support means;

a refractory insulating material filling the space between the feeder and the bottom of the support means, the refractory material encompassing the side walls of the feeder and providing supporting connection between such feeder and support means; and a fabric of heat resistant material covering at least a portion of the bottom surface of the refractory insulating material between the feeder and the support means, the fabric being suitably attached at opposite sides of the covered bottom surface of the refractory material and being in reinforcing relation with the refractory material.

* * * * *